United States Patent [19]

Ritter et al.

[11] Patent Number: 4,681,328
[45] Date of Patent: Jul. 21, 1987

[54] MAGNETIC LIQUID SHAFT SEAL

[75] Inventors: Klaus Ritter, Hirschberg; Klaus Michaelsen, Hassloch; Gunther Mair, Mannheim, all of Fed. Rep. of Germany

[73] Assignee: BASF Aktiengesellschaft, Ludwigshafen, Fed. Rep. of Germany

[21] Appl. No.: 927,367

[22] Filed: Nov. 6, 1986

[30] Foreign Application Priority Data
Nov. 9, 1985 [DE] Fed. Rep. of Germany ....... 3539777

[51] Int. Cl.$^4$ ............................................... F16J 15/40
[52] U.S. Cl. .......................................... 277/80; 277/15; 277/135
[58] Field of Search .................. 277/1, 80, 135, 15, 277/3, 27

[56] References Cited

U.S. PATENT DOCUMENTS

| | | | |
|---|---|---|---|
| 3,620,584 | 11/1971 | Rosenweig | 308/187.1 |
| 3,848,879 | 11/1974 | Hudgins | 277/80 |
| 3,909,012 | 9/1975 | Denis | 277/15 |

FOREIGN PATENT DOCUMENTS

| | | | |
|---|---|---|---|
| 0113694 | 7/1984 | European Pat. Off. | |
| 60-172777 | 9/1985 | Japan | 277/80 |
| 2145169 | 3/1985 | United Kingdom | 277/80 |

Primary Examiner—Robert S. Ward
Attorney, Agent, or Firm—Herbert B. Keil

[57] ABSTRACT

A shaft seal containing magnetic liquid, for pump shafts or the like, consists of a permanent magnet which surrounds the shaft and is a distance away and one or more pole pieces connected to the said magnet. The pole piece, together with the shaft surface, forms an air gap in which the magnetic liquid is held by the magnetic field, so that a liquid sealing ring is produced. A volume of gas located between the magnetic liquid seal and the shaft channel to the medium prevents the magnetic liquid from coming into contact with the medium.

4 Claims, 1 Drawing Figure

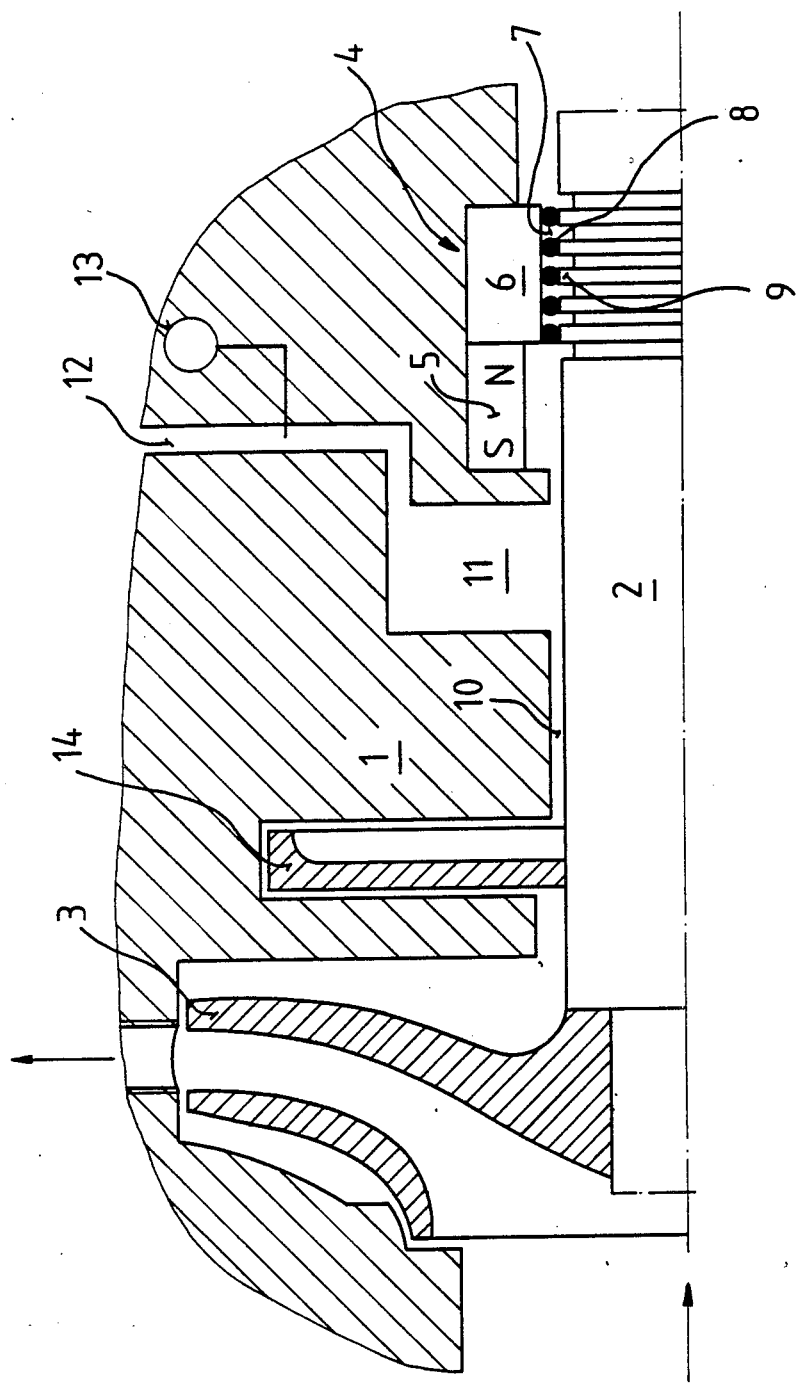

MAGNETIC LIQUID SHAFT SEAL

The present invention relates to a shaft seal which contains a magnetic liquid, for pump shafts or the like, comprising a permanent magnet which surrounds the shaft, is a distance away from the latter, is fastened in the bearing housing of the shaft and has one or more pole pieces which, together with the shaft surface, form an air gap in which the magnetic liquid is held by the magnetic field and which is sealed as a result.

Magnetic liquid seals which, as described in U.S. Pat. No. 3,620,584 and European patent application Ser. No. 0,113,694, essentially consist of one or more liquid rings which are formed and held between an annular magnetic pole and the shaft by the magnetic field, are used where it is intended to seal shafts hermetically under various pressure conditions, for example in the case of shafts in pumps which transport hazardous liquids or gases. Sealing rings of rubber or similar material provide no guarantee of a reliable shaft seal since material or manufacturing defects, but in particular wear, can result in leakages.

Problems with magnetic liquid seals may occur if the medium being transported is an aggressive liquid or gas which decomposes or dilutes the magnetic liquid.

It is an object of the present invention to provide a shaft seal containing magnetic liquid, of the type described at the outset, in which the magnetic liquid does not come into contact with the medium.

We have found that this object is achieved by a shaft seal which contains a magnetic liquid, for pump shafts or the like, comprising a permanent magnet which surrounds the shaft, is a distance away from the latter, is fastened in the bearing housing of the shaft and has one or more pole pieces which, together with the shaft surface, form an air gap in which the magnetic liquid is held by the magnetic field and which is sealed as a result, wherein a volume of inert gas which surrounds the shaft is present between the magnetic liquid seal and the shaft channel to the medium.

In the case of large pressure differences between the medium and the atmosphere, it is expedient, in an advantageous embodiment of the novel shaft seal, to provide a hydrodynamic shaft seal between the inert gas volume and the shaft channel to the medium.

An embodiment is described below, with reference to the drawing, in order to illustrate the shaft seal according to the invention.

In the drawing, the shaft seal is shown schematically in longitudinal section. The drawing shows a shaft 2 which is mounted in a pump housing 1 and has an impeller 3 and a magnetic liquid seal 4 which consists of an annular permanent magnet 5 which surrounds the shaft, is a distance away and is fastened to the housing, a pole piece 6 which is connected to the said permanent magnet and is likewise annular, and the shaft 2 and housing 1 which complete the magnetic loop. Together with the shaft surface, the pole piece forms an air gap 7, in which the magnetic liquid 8 is held by the magnetic field, producing a hermetically sealing liquid 0 ring.

By providing teeth on that surface section of the shaft 2 which is adjacent to the air gap 7, and/or on the corresponding surface of the pole piece, a plurality of narrow annular surfaces 9 having concentrated magnetic flux are produced, so that a corresponding number of separate liquid sealing rings are formed. Each of these rings withstands a pressure difference of about 0.2 bar. The total pressure which can be withstood thus corresponds to the total number of liquid sealing rings.

The annular magnet 5 can of course also be provided with a pole piece at each of the two poles, in order to form a dual liquid seal.

Suitable magnetic materials for the annular magnet 5 are conventional materials for permanent magnets, eg. magnetic steel, alnico alloys, hexagonal ferrites and plastoferrites.

Suitable magnetic liquids are commercial products based on hydrocarbon oil, ester oil, silicone oil or perfluorinated oil, and other products.

To prevent the magnetic liquid from coming into contact with the medium being conveyed by the pump, a chamber 11 surrounding the shaft 2 is provided between the magnetic liquid seal 4 described above and the shaft channel 10 on the conveying side, the said chamber being filled with an inert gas which is compatible with the magnetic liquid. The gas is fed in via a nozzle 12; the gas pressure is monitored by means of a manometer 13. Where losses of inert gas can occur as a result of leakage, the chamber has to be flushed with the inert gas.

In the case of high pump pressure, it is advantageous to relieve the load on the shaft channel 10 by a hydrodynamic shaft seal 14. It can be designed and constructed in such a way that it absorbs the major part of the pump pressure. Hydrodynamic shaft seals in a variety of embodiments are disclosed in the specialist literature (eg. Kleines Pumpenhandbuch für Chemie und Technik, Verlag Chemie GmbH, Weinheim, Günter Leuschner, 1967, pages 55–57), so that they need not be described here.

We claim:

1. A shaft seal which contains a magnetic liquid, for pump shafts or the like, comprising a permanent magnet which surrounds the shaft, is a distance away from the latter, is fastened in the bearing housing of the shaft and has one or more pole pieces which, together with the shaft surface, form an air gap in which the magnetic liquid is held by the magnetic field and which is sealed as a result, wherein a volume of inert gas which surrounds the shaft is present between the magnetic liquid seal and the shaft channel to the medium.

2. A shaft seal as claimed in claim 1, wherein that surface section of the shaft and/or of the pole piece which forms the air gap is divided into a plurality of part sections.

3. A shaft seal as claimed in claim 1, wherein the annular permanent magnet is provided, at each of the two poles, with a pole piece which forms an air gap together with the shaft surface.

4. A shaft seal as claimed in claim 1, wherein the load on the shaft channel to the medium is relieved by a hydrodynamic shaft seal.

* * * * *